US012554449B2

United States Patent
Rakshit et al.

(10) Patent No.: US 12,554,449 B2
(45) Date of Patent: Feb. 17, 2026

(54) VEHICULAR DISTRACTION MANIPULATION

(71) Applicant: International Business Machines Corporation, Armonk, NY (US)

(72) Inventors: Sarbajit Kumar Rakshit, Kolkata (IN); Sathya Santhar, Chennai (IN); Sridevi Kannan, Chennai (IN); Samuel Mathew Jawaharlal, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 18/604,823

(22) Filed: Mar. 14, 2024

(65) Prior Publication Data

US 2025/0291535 A1  Sep. 18, 2025

(51) Int. Cl.
*G06F 3/14* (2006.01)
*G06T 11/00* (2006.01)
*G06F 3/16* (2006.01)

(52) U.S. Cl.
CPC ............... *G06F 3/14* (2013.01); *G06T 11/00* (2013.01); *G06F 3/165* (2013.01)

(58) Field of Classification Search
CPC ... G06F 3/14; G06F 3/165; G06F 3/01; G06T 11/00
See application file for complete search history.

(56) References Cited

U.S. PATENT DOCUMENTS

| 9,381,916 | B1 | 7/2016 | Zhu |
| 10,901,416 | B2 | 1/2021 | Khanna |
| 11,250,279 | B2 | 2/2022 | Hassan |
| 2018/0009442 | A1* | 1/2018 | Spasojevic ........... A61B 5/4064 |
| 2018/0032078 | A1 | 2/2018 | Ferguson |
| 2020/0207358 | A1* | 7/2020 | Katz .................. G02B 27/0093 |
| 2021/0248399 | A1* | 8/2021 | Martin .................... G06F 3/013 |
| 2022/0204020 | A1* | 6/2022 | Misu .................. B60W 60/001 |

OTHER PUBLICATIONS

"Transparent OLED Displays and Transparent OLED Touch Screens", Pro Display, 11 pps., © Pro Display 2024. All rights reserved., <https://prodisplay.com/products/transparent-oled-screen/ >.
Ahlstrom, "Towards a Context-Dependent Multi-Buffer Driver Distraction Detection Algorithm", 13 pps., downloaded from the Internet on Jan. 16, 2024, <https://www.diva-portal.org/smash/get/diva2:1534306/FULLTEXT01.pdf>.
Brownlee, "A Gentle Introduction to Generative Adversarial Networks (GANs)", Machine Learning Mastery, 39 pps, Jul. 19. 2019, <https://machinelearningmastery.com/what-are-generative-adversarial-networks-gans/>.

(Continued)

*Primary Examiner* — Tan Q Nguyen
(74) *Attorney, Agent, or Firm* — Andre L. Adkins

(57) ABSTRACT

Techniques are described with respect to a system, method, and computer program product for manipulating vehicular displays. An associated method includes receiving a plurality of parameters associated with a vehicle; analyzing an environment associated with the vehicle based on the parameters; detecting at least one distraction within the environment based on the analysis; and manipulating the at least one distraction based on a plurality of contextual information of at least one occupant associated with the vehicle.

20 Claims, 6 Drawing Sheets

(56) References Cited

OTHER PUBLICATIONS

Ou et al., "Enhancing Driver Distraction Recognition Using Generative Adversarial Networks," in IEEE Transactions on Intelligent Vehicles, vol. 5, No. 3, pp. 385-396, Sep. 2020, doi: 10.1109/TIV. 2019.2960930., <https://ieeexplore.ieee.org/abstract/document/8936914>.

Zhang et al., "AutoRemover: Automatic Object Removal for Autonomous Driving Videos", Association for the Advancement of Artificial Intelligence, Nov. 28, 2019, 9 pps., <https://arxiv.org/pdf/1911.12588.pdf>.

\* cited by examiner

VEHICULAR DISTRACTION MANIPULATION

BACKGROUND

This disclosure relates generally to the field of computerized display enhancements, and also the field of generative adversarial networks.

Augmenting multi-media data (e.g., image, video, sound data, etc.) is one of the many features provided by enhancing machine learning applications; in which the aforementioned data may be modified in a manner that not only enhances the applicable user experience, but also renders an optimal environment for users in regards to safety and security. In particular, operating automobiles is an inherently dangerous task due to the fact that there are a multitude of internal and external factors that have potential to directly impact operators such as, but not limited to distracting advertisements/promotional content, road conditions/crashes, instructional signs, and the like. The ability to enhance physical environments associated with automobile operators and/or occupants via computer-generated information using one or more sensory modalities such as visual, auditory, haptic, olfactory, etc. is substantial via the use of augmentation to render computer-generated multi-media over the automobile's display mechanisms. Therefore, environment augmentation optimizes the vehicle experience (both autonomous and non-autonomous) in real-time.

SUMMARY

Additional aspects and/or advantages will be set forth in part in the description which follows and, in part, will be apparent from the description, or may be learned by practice of the invention.

A system, method, and computer program product for manipulating vehicular displays is disclosed herein. In some embodiments, a computer-implemented method for manipulating vehicular displays comprises receiving a plurality of parameters associated with a vehicle; analyzing an environment associated with the vehicle based on the parameters; detecting at least one distraction within the environment based on the analysis; and manipulating the at least one distraction based on a plurality of contextual information of at least one occupant associated with the vehicle.

In some aspects of an embodiment of the present invention, detecting the at least one distraction comprises ranking the at least one distraction based on the plurality of contextual information. This feature allows distraction to be ranked and prioritized for manipulation based on contextual information associated with the vehicle and/or occupant(s) including, but not limited to vehicle conditions, traffic conditions, operator driving experience, user preferences, and the like.

In some aspects of an embodiment of the present invention, manipulating the at least one distraction comprises incrementally increasing a level of visibility of the at least one distraction to the at least one occupant based on the ranking. This feature facilitates the ability to visualize distractions to occupants on the GAN-enabled display(s) based on the prioritization of the at least one distraction ascertained from analyses of the contextual information.

In some aspects of an embodiment of the present invention, manipulating the at least one distraction comprises utilizing a generative adversarial network (GAN) to generate a visualization modifying or removing the at least one distraction based on the plurality of contextual information. This feature facilitates modification of the distractions in real-time subject to changing of context based on the continuous analyses of contextual information.

In some aspects of an embodiment of the present invention, the plurality of parameters comprise one or more of vehicle information, road conditions, weather conditions, social media information, crowdsourcing information, and driving skills associated with the at least one occupant. This feature ensures that the visualization presented to occupants within the vehicular environment are presented based on contextual information ascertained from the various parameters.

In some aspects of an embodiment of the present invention, manipulating the at least one distraction comprises classifying the at least one distraction and modifying an audio file associated with the at least one distraction based on an analysis of the plurality of contextual information. This features provides elimination of various audio that would otherwise disturb and/or distract vehicle occupants while the vehicle is in operation.

In some aspects of an embodiment of the present invention, detecting the at least one distraction comprises assigning a threshold to the level of visibility based on the plurality of parameters; wherein the level of visibility increases for the at least one distraction based upon the threshold being exceeded. This feature allows distractions to be progressively more visible to vehicle occupants based on the contextual information associated with the vehicle and/or occupant(s) in real-time.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Figure 1:
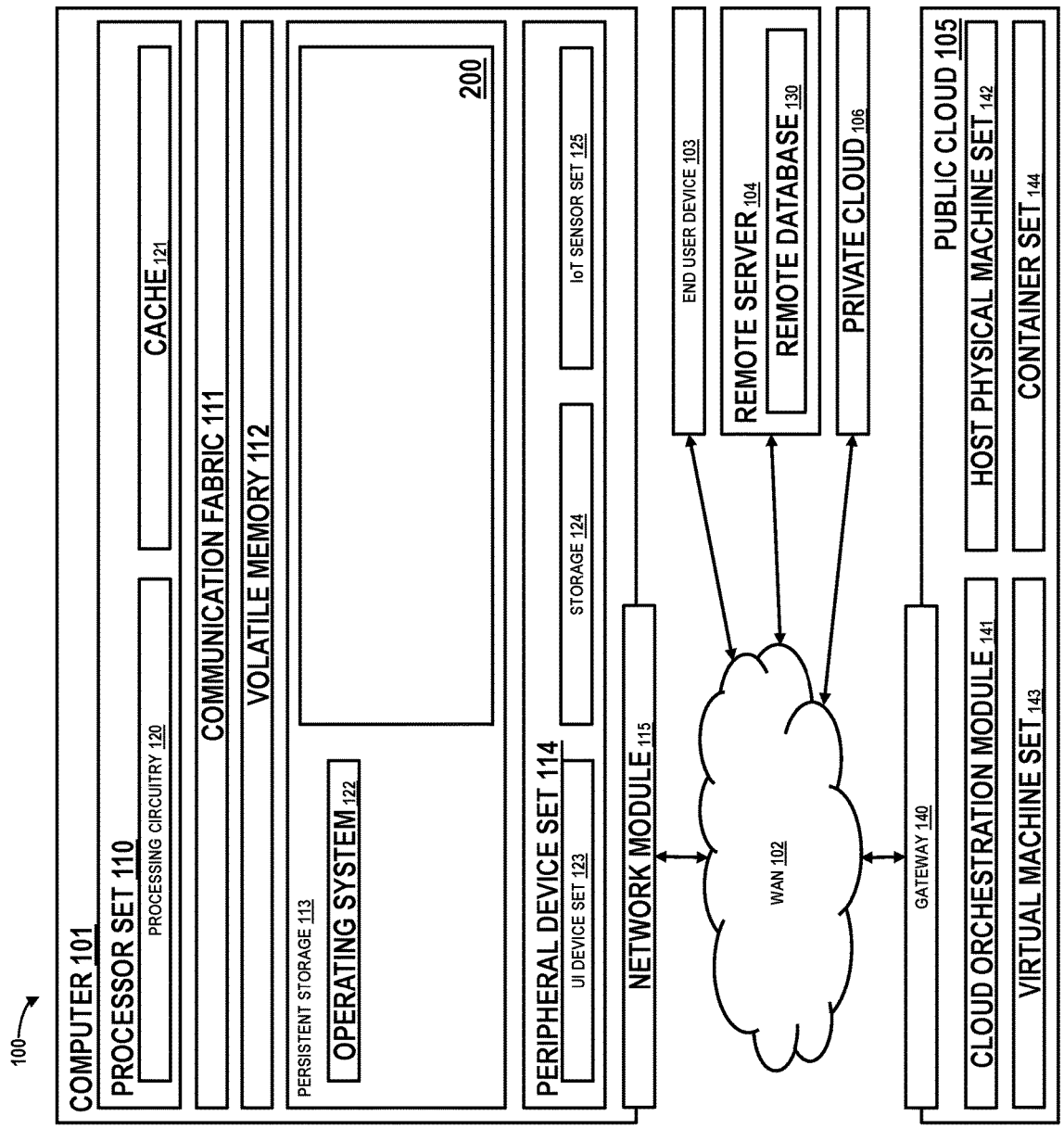
FIG. 1 illustrates a networked computer environment, according to an exemplary embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

The following described exemplary embodiments provide a method, computer system, and computer program product for manipulating vehicular displays. Environment augmentation allows users to engage with an interactive experience comprising computer-generated data based on sensory modalities (e.g., visual, haptic, olfactory, etc.) being overlaid on the applicable physical surroundings. Vehicles currently possess the capability to sense its environment and utilize various sources of data such as, but not limited to operator's preferences/behavior, traffic/road conditions, environmental conditions, and the like to optimize the vehicular experience. However due to the voluminous amount of activities occurring during the vehicular experience, operators and/or occupants of vehicles are exposed to numerous distractions that have the potential to divert attention away for operating the applicable vehicle and/or the current task within the vehicular setting (e.g., reaching a particular destination, ensuring vehicular safety, etc.). Therefore, the present embodiments have the capacity to not only eliminate distractions within a vehicular environment, but also optimize the vehicle experience by utilizing vehicle parameters, environmental factors, user analytics, and the like to detect and manipulate distractions. In addition, the present embodiments utilize artificial intelligence technologies, such as but not limited to generative models to render visualizations of manipulated distractions (e.g., removed distractions, modified audio outputs, amplified/animated road signs, etc.) for presentation on the applicable vehicle displays in a scalable manner; thus, increasing safety and security on the road along with improving the overall vehicular experience. Furthermore, the present embodiments utilize the aforementioned generative models to assist with the manipulation of the distractions in a manner that preserves computing resources that would otherwise be needed to visualize the manipulations on applicable vehicular displays (e.g., GPU utilization, video random access memory (VRAM), and the like).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It is further understood that although this disclosure includes a detailed description on cloud-computing, implementation of the teachings recited herein are not limited to a cloud-computing environment. Rather, embodiments of the present invention are capable of being implemented in conjunction with any other type of computing environment now known or later developed.

The following described exemplary embodiments provide a system, method, and computer program product for constructing personalized virtual environment-based marketplaces. Referring now to FIG. 1, a computing environment 100 contains an example of an environment for the execution of at least some of the computer code involved in performing the inventive methods, such as system 200. In addition to system 200, computing environment 100 contains an example of an environment for the execution of at least some of the computer code involved in performing the inventive methods. Computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and system 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart vehicle/autonomous vehicle (i.e., any applicable vehicle communicatively coupled to a network), smart phone, smart watch or other wearable computer, computer-mediated reality device (e.g., AR/VR headsets, AR/VR goggles, AR/VR glasses, etc.), mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) payment device), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD payment device. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter payment device or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
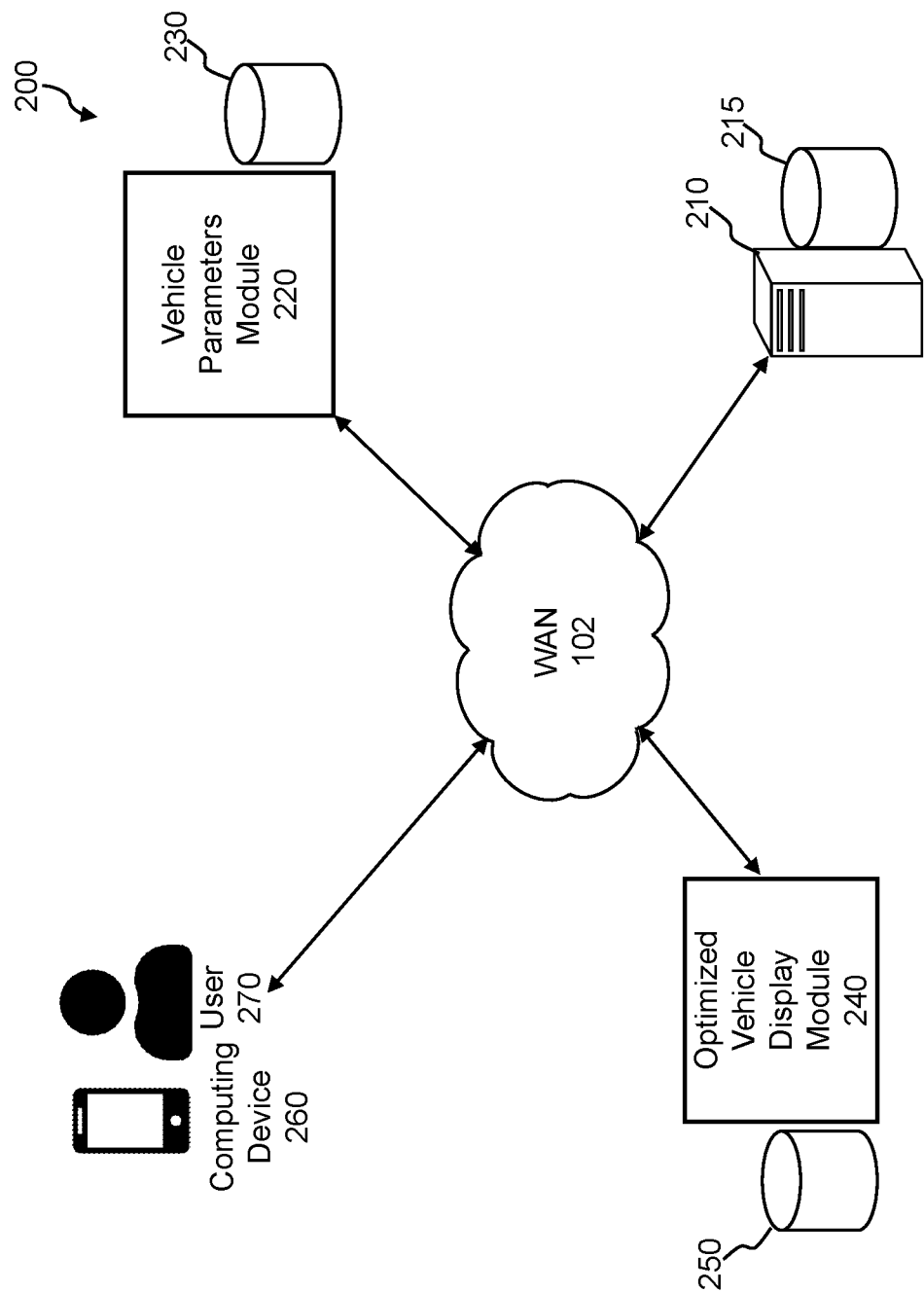
FIG. 2 illustrates a block diagram of a vehicular display manipulation system environment, according to an exemplary embodiment.

Referring now to FIG. 2, a functional block diagram of a networked computer environment illustrating a computing environment for a vehicular display manipulation system 200 (hereinafter "system") comprising a server 210 communicatively coupled to a database 215, a vehicle parameters module 220, a vehicle parameters module database 230, an optimized vehicle display module 240, an optimized vehicle display module database 250, a computing device 260 associated with a user 270, each of which are communicatively coupled over WAN 102 (hereinafter "network") and data from the components of system 200 transmitted across the network is stored in database 215.

In some embodiments, server 210 is tasked with providing a centralized platform for collecting and analyzing non-vehicular related data sources for the purpose of transmitting the analyzed data to vehicle parameters module 220 and/or optimized vehicle display module 240. As a result, outputs of vehicle parameters module 220 and/or optimized vehicle display module 240 account for various factors and components outside of the vehicular environment in order to ultimately render optimized vehicular displays. Examples of the non-vehicular related data sources include but are not limited to traffic data sources, crowdsourced data sources, weather data sources, mapping data sources, crime-related data sources, social media-based data sources, biometric-related data sources associated with user 270, automotive industry-related data sources, and any other applicable data sources configured to optimize the vehicular experience known to those of ordinary skill in the art. For example, traffic, weather, and social media-based data sources allow vehicle parameters module 220 to ascertain the optimal route to a destination that circumvents distractions in real-time. Furthermore, the aforementioned data allows the optimal route to be rendered taking into account toll fees, parking fees, applicable levels of propensity along the route (e.g., avoiding dangerous neighborhoods, areas with historical high likelihood of car accidents, etc.), and the like. In some embodiments, server 210 may be communicatively coupled to one or more web crawlers configured to crawl applicable internet-based data sources in order to extract relevant data associated with user 270 including, but not limited to geographic location of user 270, contextual information, social media platforms, crowdsourcing platforms, and the like. For example, analyses of linguistic inputs of user 270 along with social media-based activity (e.g., likes, comments, page browsing, etc.) may indicate user 270 desires a particular type of food, in which the optimal route to the applicable destination may be rendered in a manner that comprises the most exposure to establishments along the route that provide said particular type of food. Server 210 may further utilize one or more application programming interfaces (APIs) to provide the functionality to receive user inputs of user 270 via computing device 260 and/or the applicable vehicular interactive interface for the purpose of receiving user preferences, configuration/design choices, user feedback, and the like in order to optimize the vehicular experience. Data associated with computing device 260 and/or user 270 may be stored in a user profile associated with user 270 housed in database 215 for subsequent analyses by vehicle parameters module 220, and various modules described herein may utilize one or more supervised and/or unsupervised learning techniques (e.g. feedback loops) processing datasets derived from database 215 in order to continuously optimize the vehicular experience for user 270 taking into account user preferences, configuration/design choices, user feedback, and the like. For example, it may be ascertained that user 270 prefers to take routes that do not pass through particular neighborhoods based upon analyses of previous vehicular experiences associated with user 270 due to previous traffic, potholes, flat tires, etc.

Vehicular parameters module 220 is tasked with collecting and analyzing vehicular parameters and vehicular environment data associated with the applicable vehicular system communicatively coupled to computing device 260 along with user-specific information associated with user 270. In some embodiments, vehicular parameters module 220 is communicatively coupled with one or more vehicle operating systems, computer vision systems, and any other applicable vehicle and/or user monitoring system known to those of ordinary skill in the art, in which the vehicular parameters are stored in vehicle parameters module database 230. Vehicular parameters module 220 collects and analyzes vehicle parameters that may include, but are not limited to vehicle speed, driving patterns of an autonomous vehicle, battery analytics (e.g., battery life, consumption trends, overheating etc.), engine analytics, air quality, steering/torque, air/fuel measurements, blind spot analytics, ventilation/cooling/heating, and any other applicable vehicle parameters known to those of ordinary skill in the art. Vehicular parameters module 220 is further tasked with communicating with server 210 and/or computing device 260 in order to ascertain user-specific data associated with user 270 including but not limited to user driving patterns, biometric data, lifestyle analytics, and the like. In addition, vehicular parameters module 220 is configured to ascertain contextual information associated with user 270 by utilizing one or more of natural language processing ("NLP")/linguistics processing, image/media recognition, object recognition, predictive analytics, behavioral classification techniques, and the like in order to establish a context associated with user activities of user 270 including, but not limited to time, location, sentiment, and any other contextual related information known to those of ordinary skill in the art. It should be noted that one of the purposes of ascertaining contextual information is to assist optimized vehicle display module 240 with not only detecting distractions, but also scoring distractions for the purpose of determining which distractions are manipulated and which are removed from the applicable vehicle display altogether. For example, ascertained contextual information may indicate that the vehicular experience of user 270 is negatively impacted by sounds associated with traffic, crashes, road rage, and the like; in which vehicular parameters module 220 may instruct optimized vehicle display module 240 to modify an audio file associated with at predicted and/or detected distraction based on an analysis of the contextual information (e.g., modifying a car crash sound into classical music, etc.). As a result, the modified audio file is emitted internally throughout the applicable vehicle preventing the original distracting sound to be audible.

Optimized vehicle display module 240 is tasked with not only detecting and ranking vehicular distractions within the vehicular environment, but also manipulating vehicular distractions for the purpose of visualizing the manipulated distractions to the operator and/or occupants on the applicable vehicular display. It should be noted that distraction manipulation may include, but is not limited to moving, removing, enhancing (e.g., via visual and/or audio effects), and any other applicable generative adversarial network (GAN) derived modification known to those of ordinary skill in the art. In some embodiments, optimized vehicle display module 240 is configured assign a distraction threshold to a detected distraction based upon analysis of the ascertained contextual information, in which if the distraction threshold is exceeded then optimized vehicle display module 240 manipulates the distraction resulting in a modified visualization on the applicable GAN-enabled vehicular display. For example, a distraction detected by optimized vehicle display module 240 is a wild life animal within the viewpoint outside of the applicable vehicle associated with user 270, in which the ascertained contextual information indicates that user 270 has an affinity for wildfire that usually tends to distract focus from the road and/or operating the vehicle. As a result, optimized vehicle display module 240 manipulates the detected distraction (e.g., removes the wild life animal from the outlook visualized on the applicable vehicular display) preventing user 270 from being able to see the distraction and focus on operating the vehicle. Optimized vehicle display module database 250 serves as a repository for not only detected distractions, obstacles, etc.; but also, outputs of the applicable machine learning models maintained by optimized vehicle display module 240 and visualizations and audio files presented to user 270.

Computing device 260 may take the form of a desktop computer, laptop computer, tablet computer, smart phone, smart watch or other wearable computer, mainframe computer, computer-mediated reality (CMR) device/VR device, quantum computer or any other form of computer or mobile device now known or to be developed in the future that is capable of running a program, accessing a network, or querying a database. It should be noted that in the instance in which computing device 260 is communicatively coupled to a vehicular-based communication system or other applicable communicative system, computing device 260 is configured to collect sensor data via one or more associated sensor systems including, but are not limited to, cameras, microphones, position sensors, gyroscopes, accelerometers, pressure sensors, cameras, microphones, temperature sensors, biological-based sensors (e.g., heartrate, biometric signals, etc.), a bar code scanner, an RFID scanner, an infrared camera, a forward-looking infrared (FLIR) camera for heat detection, a time-of-flight camera for measuring distance, a LaDAR sensor, a LiDAR sensor, a temperature sensor, a humidity sensor, a motion sensor, internet-of-things ("IoT") sensors, or any other applicable type of sensors known to those of ordinary skill in the art. In some embodiments, computing device 260 is configured to visualize manipulations and/or communicate with GAN-enabled displays or any other applicable vehicular displays designed to depict augmented content known to those of ordinary skill in the art. Computing device 260 may be embedded into semi-autonomous and/or autonomous vehicle systems, in which the determined type of vehicle that system 200 is visualizing manipulations within may be taken into consideration within the vehicle parameter for the purpose of dictating configurations, aesthetics, and the like. For example, if the applicable vehicle is autonomous mode then the ranking of a distraction may be impacted.

Figure 3:
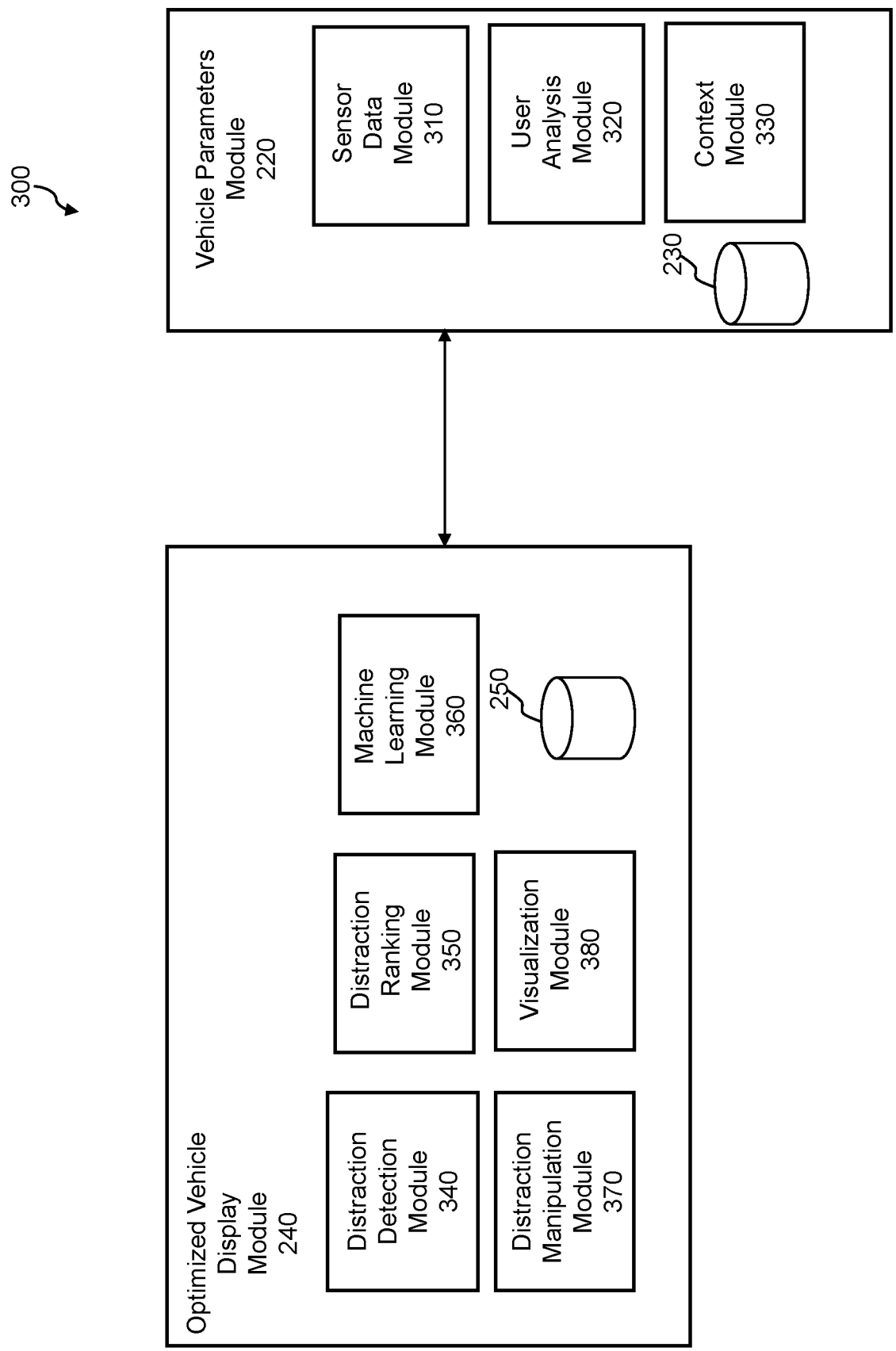
FIG. 3 illustrates a block diagram of various modules associated with the vehicular display manipulation system of FIG. 2, according to an exemplary embodiment.

Referring now to FIG. 3, an example architecture 300 of vehicle parameters module 220 and optimized vehicle display module 240 is depicted, according to an exemplary embodiment. Vehicle parameters module 220 comprises sensor data module 310, user analysis module 320, and context module 330. Optimized vehicle display module 240 comprises distraction detection module 340, distraction ranking module 350, machine learning module 360, distraction manipulation module 370, and visualization module 380. It should be noted that vehicle parameters module 220 and optimized vehicle display module 240 are communicatively coupled over the network allowing for outputs and/or analyses performed by each respective module to be utilized in applicable training datasets to be utilized by applicable machine learning models operated by machine learning module 360 and/or applicable cognitive systems associated with system 200.

Sensor data module 310 is designed to collect various sensor data associated with the internal and/or external environment of the applicable vehicle associated with computing device 260, and any other applicable systems associated with user 270 including, but not limited to sensor systems, monitoring systems, computer vision systems, aerial imagery systems, traffic monitoring systems, crowd-sourcing data systems, broadcasting systems, weather monitoring systems, and the like. Vehicle parameters may include, but is not limited to external/internal vehicle surface conditions, vehicle size/orientation, battery analytics, steering, braking, acceleration/deceleration, air quality, trip analytics (e.g., trip time, route frequency, etc.), latency, and the like. Due to the volume of sensor data being continuously collected and processed by sensor data module 310, sensor data module 310 is configured to partition and annotate collected sensor data based on the source it is derived from and subsequently store it in vehicle parameters module database 230. The aforementioned is performed in a manner that is consistently adapting based on constantly changing external and internal environments, in which the partitioning may be triggered based on the determination of which mode the vehicle is in. For example, partitioning of sensor data may be triggered upon non-autonomous mode being detected in order to ensure optimized vehicle parameters and subsequent visualizations/depictions for when user 270 is manually operating the vehicle. Sensor data module 310 image data, video data, LIDAR data, LADAR data, eye gazing data/historical eye movement, air quality data, ventilation-based data, steering data, occupant seating-related data (e.g., seat position, temperature, firmness, height, etc.), and/or other applicable ascertainable data associated with the vehicular environment known to those of ordinary skill in the art.

User analysis module 320 is tasked with collecting and analyzing user-specific information associated with user 270 and/or occupants of the applicable vehicle associated with system 200. In some embodiments, user analysis module 320 maintains a user profile associated with user 270 comprising user-specific information user analysis module 320 and/or the applicable web crawlers associated with server 210. For example, the user profile may comprise analyses of movement data, biological data (e.g., heartrate, body temperature, pulse, etc. of operator and/or occupants), driving analytics, social media-based information, vehicular preferences, lifestyle patterns, and the like associated with user 270, in which the user profile is stored and continuously updated on vehicle parameters module database 230. As a result of collecting and analyzing the aforementioned, ascertaining contextual information, distraction detection, and distraction ranking is optimized for ultimately the visualization of distraction manipulations to user 270 on the applicable vehicular display. For example, ascertaining driving patterns, food preferences, navigation preferences, and the like associated with user 270 supports context module 330 with establishing that user 270 prefers traversing a particular route to a particular destination due to the fact that it passes one of their favorite restaurants; thus, optimized vehicle display module 240 is able to visualize illustrative guidance with supporting animations on the applicable vehicular display. The user profile may further comprise various types of data relating to previous trips associated with user 270, in which user analysis module 320 communicates with machine learning module 360 in order to operate a feedback loop configured to optimize the presentation of visualized and depicted distractions via supervised and/or unsupervised learning.

Context module 330 is tasked with ascertaining contextual information for the purpose of identifying, ranking, and depicting distractions within the vehicular setting. In some embodiments, context module 330 is configured to utilize natural language processing ("NLP")/linguistics processing, machine learning models, Long short-term memory (LSTN), convolutional neural networks (CNN), image/media recognition, object recognition, predictive analytics, behavioral classification techniques, and other applicable cognitive based algorithms in order to establish a context associated with user 270 and interactions with computing device 260 and/or the applicable vehicle. It should be noted that context may be ascertained from one or more of user activities on computing device 260 (e.g., browsing history, social media-based interactions, etc.), linguistic inputs within the vehicular environment, detected concepts, emotions, visual representations, biological data (e.g., body movements, facial movements/EMG, bodily-based readings, etc.), and the like. In some embodiments, context module 330 analyzes the user profile in order to ascertain contextual information configured to be transmitted to machine learning module 360 resulting in outputs of the applicable machine learning models representing predictions distractions of user 270 within the vehicular environment. For example, the user profile may indicate that user 270 dislikes traffic noises during their vehicular experience in which optimized vehicle display module 240 is configured to utilize this information to modify applicable audio files associated with detected distractions based on an analyses of contextual information ascertained by context module 330; thus, resulting in a tranquil mode being generated comprising relaxing visual experience (e.g., dim lighting, relaxing sounds, and the like) visualized on the applicable vehicular display(s) and modified audio files configured to mask traffic noises and the like from being emitted from applicable vehicular sound sources. In another example, user 270 may utter that they are attempting to diet and/or lose weight in which context module 330 ascertains that user 270 would like to reduce the amount and/or type of food consumed on a daily basis. As a result, fast food restaurants are classified based on the aforementioned by optimized vehicle display module 240 as distractions and manipulated/removed from the view of user 270 through the applicable vehicular displays. Therefore, while the applicable vehicle user 270 is operating/occupying is traversing its route not only are fast food restaurants encountered along the route manipulated, but also promotional content and the like pertaining food are concealed from presentation of the applicable vehicular display.

Distraction detection module 340 is tasked with identifying distractions associated with the interior and/or exterior of the applicable vehicle. It should be noted that distraction detection module 340 not only actively detects distractions along one or more routes the applicable vehicle is traveling, but also predicts potential distractions that user 270 may come across along the one or more routes based on factors including but not limited to contextual information, a threshold proximity to the vehicle, vehicle location, user profile, previous interactions, complexity of the distraction, whether the vehicle is in manual or automated mode, and the like. As described herein, distractions may be any applicable visual, auditory, haptic, etc. related obstacles encountered and/or predicted to be encountered by the applicable vehicle. Multimedia detection mechanisms (e.g., aggregate channel features, etc.), computer visioning, traffic monitoring systems, and the like may be in communication with machine learning module 360 allowing one or more machine learning models to output predictions representing distractions for user 270. For example, distraction detection module 340 may communicate with context module 310 to ascertain that user 270 is an inexperienced driver in which distraction detection module 340 may identify internal distractions within the applicable vehicle (e.g., computing devices within the vehicle, other occupants, etc.) and external distractions (e.g., roadside advertisements, collisions, etc.) as candidates that need to be processed by distraction ranking module 350 for scoring in order to be manipulated and optimize the vehicular experience. It should be noted that one of the purposes of distraction detection module 340 is to ensure safety of operation of the applicable vehicle regardless of whether the vehicle is in autonomous or manual mode. One way of performing the aforementioned is to provide instructions to the other modules of distraction detection module 340 by taking into account various factors such as, but not limited to number of occupants, vehicle location, weather, familiarity with vehicle and location, time of day, factors derived from analyses of contextual information, etc. in order to ultimately determine if the applicable distraction(s) need to be manipulated before being viewed by user 270 on the applicable vehicular display.

Distraction ranking module 350 is tasked with scoring and ranking distractions detected by distraction detection module 340. In some embodiments, distraction ranking module 350 establishes a distraction threshold which is assigned to identified distractions, in which the distraction threshold may be correlated to a level of visibility of the distraction for user 270 through the applicable vehicular display. For example, upon the distraction threshold being exceeded the level of visibility of the distraction may be increased. The ranking of distractions along with the distraction threshold may be established by distraction ranking module 350 based on one or more of user profile, vehicle parameters, location of the applicable vehicle, contextual information, focus score (e.g., level of attentiveness of user 270), and the like. For example, the vehicle may be traversing a route in which promotional content along the route may be obscured due to user 270 operating the vehicle in manual mode, in which the vehicle switches to autonomous mode distraction ranking module 350 takes into consideration the location of the vehicle, contextual information, etc. and determines that distraction threshold for a particular distraction has been exceeded resulting in the level of visibility of the particular distraction increasing on the applicable vehicular display. In addition, distraction ranking module 350 is configured to perform tagging/annotating of metadata to identified distractions during the ranking process based on various correlations such as, but not limited to vehicle mode, location, subject, level of distraction to user 270, associated route traversal, and the any other applicable labels known to those of ordinary skill in the art. Furthermore, distraction thresholds applied to the distractions are configured to assist distraction ranking module 350 with assigning priorities to distractions, in which a priority assigned to a distraction is based on analyses of the contextual information. This feature allows for distractions to fluctuate in visibility and to be filtered based upon the current circumstances of the vehicular experience. For example, a first distraction may be concealed during the vehicle traversing a route due to the fact that the contextual information indicates they are lost and/or do not know exactly how to get to a particular destination, in which subsequently a second distraction comprising a higher assigned priority than the first distraction may be visualized to user 270 based upon the contextual information indicating that user 270 is familiar with their surroundings.

Machine learning module 360 is configured to use one or more heuristics and/or machine learning models for performing one or more of the various aspects as described herein (including, in various embodiments, the natural language processing or image/media analysis discussed herein). In some embodiments, the machine learning models may be implemented using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, back propagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting, and any other applicable machine learning algorithms known to those of ordinary skill in the art. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are considered to be within the scope of this disclosure. For example, machine learning module 360 is designed to maintain one or more machine learning models dealing with training datasets including data derived from one or more of database 215, vehicle parameters module database 230, optimized vehicle display module database 250, and any other applicable internet-based data source. Furthermore, the one or more machine learning models are designed to generate outputs representing predictions pertaining to contextual information, distractions, ranking/scoring of distractions, thresholds, distraction manipulations, and the like. For example, previously identified distractions, distraction rankings, distraction threshold, distraction manipulations, etc. may be utilized within the training datasets in order to optimize predictions of future outputs for manipulations manifested on the applicable vehicular display. In another example, one or more of the machine learning models may predict a high score for an identified distraction based upon the amount of stimulation associated with the distraction (e.g., promotional content with a significant amount of graphics, words, sounds, etc.).

Distraction manipulation module 370 is configured to apply the manipulations to the distractions. It should be noted that manipulations may include, but are not limited to any applicable visual, auditory, haptic, etc. modifications made to distractions. Manipulations may amplify distractions with captivating graphics (e.g., applied multi-media content, volumetric video, holograms, etc.), modify sound files, remove/conceal/obscure distractions, modify the size or orientation of distractions, change the opacity/visibility of distractions, visualize supporting text, and any other applicable vehicular multi-media presentation known to those of ordinary skill in the art. For example once roadside activities (e.g., crashes, altercations, advertisements, etc.) are identified and ranked, distraction manipulation module 370 may provide visual (e.g., video, text, etc.) and/or audio supplemental information relating to the roadside activities for presentation within the vehicle. Distraction manipulation module 370 further manages which distractions are depicted, obscured, and/or concealed from outside of the vehicle. Distraction manipulation module 370 also is designed to adjust the level of visibility associated with a distraction based on analyses of contextual information derived from context module 310. In some embodiments, the adjustment of the level of visibility is also based on the automation state associated with the vehicle (e.g., manual control vs. automatic control). Distraction manipulation module 370 may also utilize contextual information to determine whether a distraction is to be presented within the vehicle altogether. For example, if user 270 is an inexperienced driver traversing a route that has a significant amount of promotional content, then distraction manipulation module 370 may conceal all promotional content from being presented to user 270 when operating the vehicle. Distraction manipulation module 370 is configured to utilize a virtual, augmented, mixed, and/or extended reality-based system in order to provide user 270 an artificial sensory simulations experience comprising overlaid sounds, videos, images, graphics, etc. allowing user 270 to interact with, move around, and otherwise experience virtual environments within the vehicle.

Visualization module 380 is tasked with depicting the manipulations of distractions. It should be noted that visualization module 380 is configured to utilize a generative adversarial network (GAN) to render visualizations and other applicable multi-media content to the applicable vehicular displays. In some embodiments, the GAN comprises a generator and a discriminator, in which the generator renders the visualization utilizing the contextual information as input; thus, the visualizations and other applicable multi-media content account for vehicle/user location, weather, traffic, level of driving experience, and the like. Visualization module 380 may further use the GAN for enhancing visualizations by focusing on realistic textures rather pixel-accuracy, and visualization module 380 supports streaming of the renderings to GAN-enabled displays within the vehicle. In particular, visualization module 380 transmits the rendered visualizations of the distraction manipulations through the network, enhances them, and then sends them to the applicable GAN-enabled display device. In some embodiments, visualization module 380 may perform the aforementioned in a manner that reduces the amount network bandwidth necessary by performing cluster-wise transmissions between visualization module 380, computing device 260, and the applicable GAN-enabled display devices of the vehicle. In some embodiments, visualization module 380 communicates with machine learning module 360 in order to instruct the GANs, in which the GANs may be a completely trained offline model installed directly in the vehicle and/or computing device 260 may hosted in a cloud environment to make use of the cloud computing resources with optimal performance. The GANs may further comprise an orchestrator designed to switch between two modes based on the current internet bandwidth and future bandwidth predicted by machine learning module 360 for the vehicle based on the route being traversed. While machine learning module 360 is training the GAN models, distributed training may be used by dividing the workload and dataset based on the contextual information thereby reducing the training time. When a trained model is used, feedback can be obtained from user 270 which may be used to simultaneously train another version of the same model based on the feedback. Once trained and validated, the new version can replace the original version in real time; thus, the training process is optimized and kept accurate in real-time.

Figure 4:
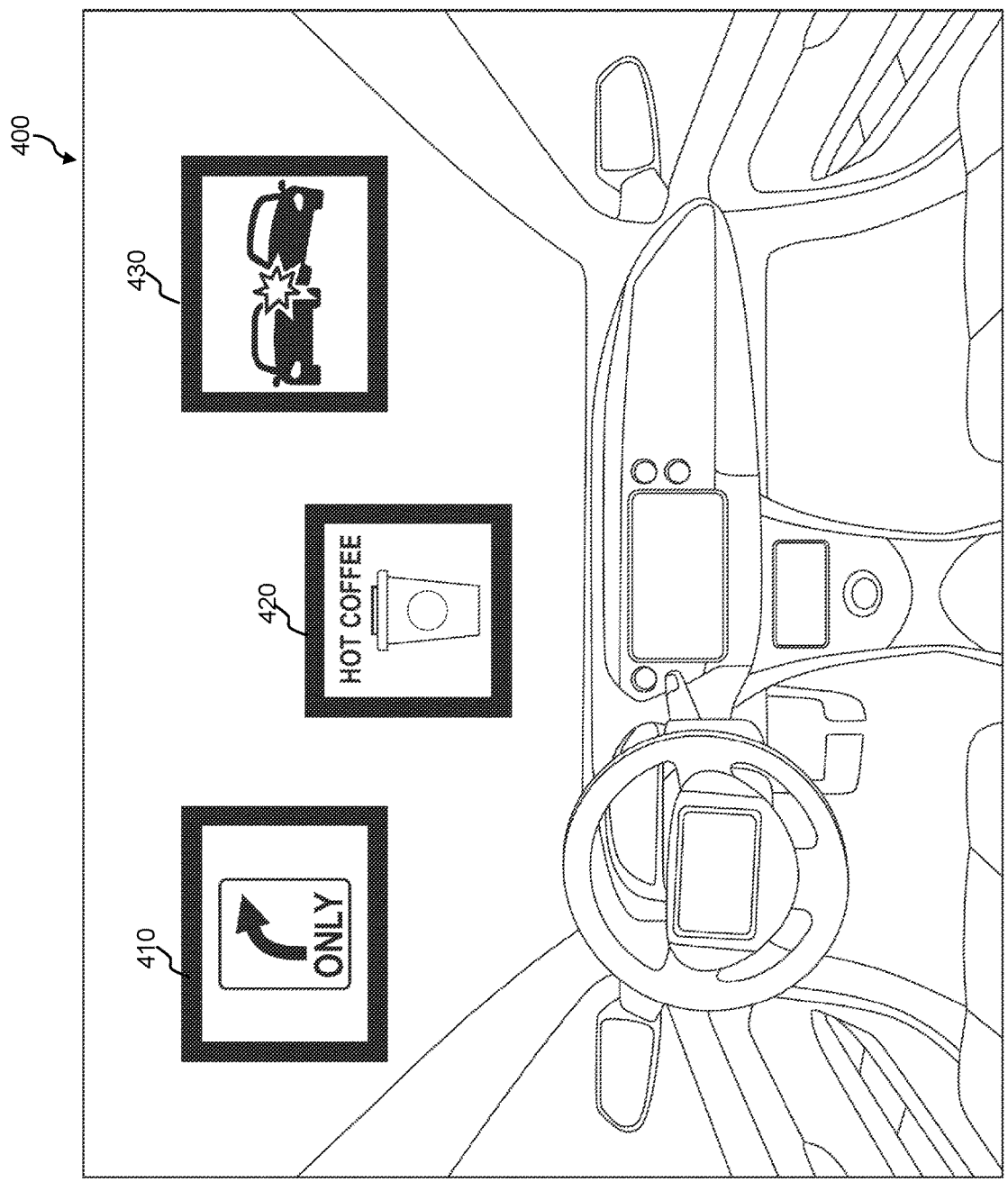
FIG. 4 illustrates a view of a series of identified distractions presented on a display mechanism of a vehicle, according to an exemplary embodiment.

Referring now to FIG. 4, a series of identified distractions 410-430 visualized on a GAN-enabled display 400 of a vehicle is depicted, according to an exemplary embodiment. As depicted, identified distraction 410 is a street sign, identified distraction 420 is promotional content for a beverage, and identified distraction 430 is a car collision, each of which are external to the vehicle and detected by distraction detection module 340 while the vehicle traverses an applicable route. In some embodiments, identified distractions 410-430 are detected based upon one or more of the collected vehicle parameters, data derived from database 215, vehicle parameters module database 230, optimized vehicle display module 240, optimized vehicle display module database 250, and/or the user profile associated with user 270 who may be the operator or an occupant of the vehicle. For example, contextual information derived from analyses of one or more of the aforementioned data sources indicates that user 270 is an avid coffee drinker who frequently stops for coffee during vehicle excursions and also dislikes the sounds and commotion caused by traffic, vehicle collisions, and the like. As a result, distraction detection module 350 analyzes identified distractions 410-430 in light of the contextual information to discover that user 270 is traversing this particular route for the first time; thus, priority should be assigned to identified distraction 410 so that user 270 can reach the destination.

Machine learning module 360 communicates with and instructs distraction detection module 340 to continuously identify the distractions and distraction ranking module 350 to assign them a level of priority based on the level of distraction. However in some embodiments, the distraction threshold is set based on the mode of the car (e.g., autonomous or manual mode). For example If the level of distraction is a score between 1 and 10 with 1 being the lowest level of distraction when the vehicle is running in autonomous mode, then the threshold may be set as 7 based on previous learning so that all distractions above level 7 would be removed. Whereas if the vehicle is running in manual mode, the threshold may be set as 3 so that all distractions with greater than 3 are removed. Thresholds also vary based one or more of user profile, contextual information, type of roads associated with route, weather parameters, history of accidents, traffic, and the like. If the mode shifts between manual and autonomous often (e.g., threshold amount of time may establish in order to identify frequency of shifts), then shift in modes within 3 minutes for more than 3 times can be classified as frequent in which the visualization is set for manual mode as frequent transition of display might impact user 270.

Figure 5:
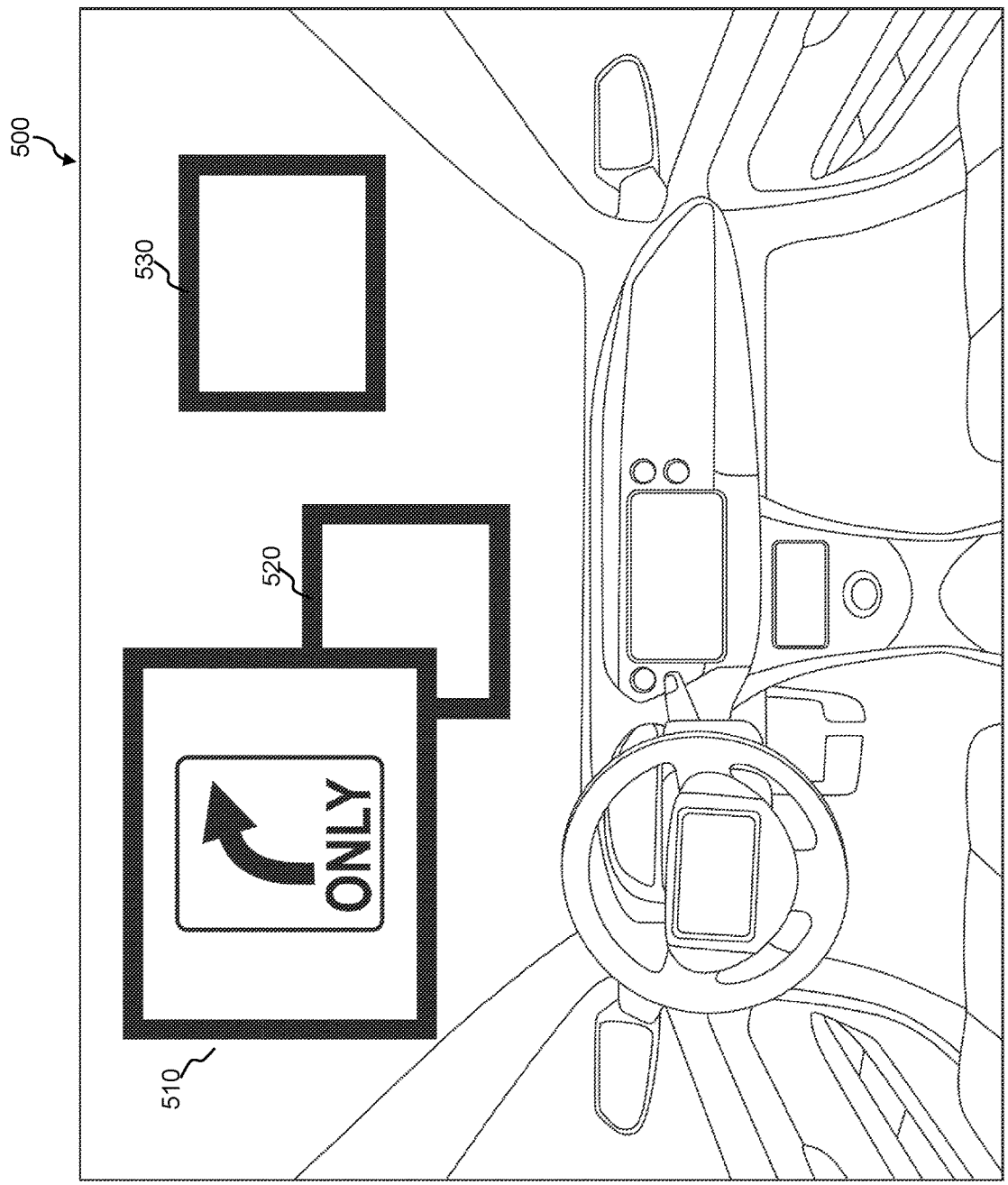
FIG. 5 illustrates an optimized view of the display mechanism of the vehicle of FIG. 4 including the first series of identified distractions rectified by manipulation, according to an exemplary embodiment.

Referring now to FIG. 5, an optimized view of the GAN-enabled vehicular display mechanism 500 is depicted, according to an exemplary embodiment. Based on the analyses of the aforementioned identified distractions in light of the ascertained contextual information, the identified distractions are scored and ranked accordingly, in which the scoring and/or ranking processed by distraction manipulation module 370 in order to apply one or more manipulations to the identified distractions resulting in manipulated distractions 510-530 for visualization and/or depiction by visualization module 380 on the GAN-enabled vehicular display. For example, manipulated distraction 510 is an illuminated and animated version of the street sign (e.g., simultaneously captivating the attention of user 270 in addition to diverting the attention to route guidance), manipulated distraction 520 is removed from visibility by user 270 on the GAN-enabled display altogether, and manipulated distraction 530 is modified from crash-related commotion to tranquil-related audio files (e.g., running water, rain sounds, nature sounds, etc.) to emitted with the applicable audio sources (i.e., speakers) within the vehicle environment. It should be noted that distraction manipulation module 370 supports flashing, shrinking, expanding, disorienting, and any other applicable visual effects known those of ordinary skill in the art, in which visualization module 380 overlays the manipulations manifested as multi-media content on the identified distractions.

Figure 6:
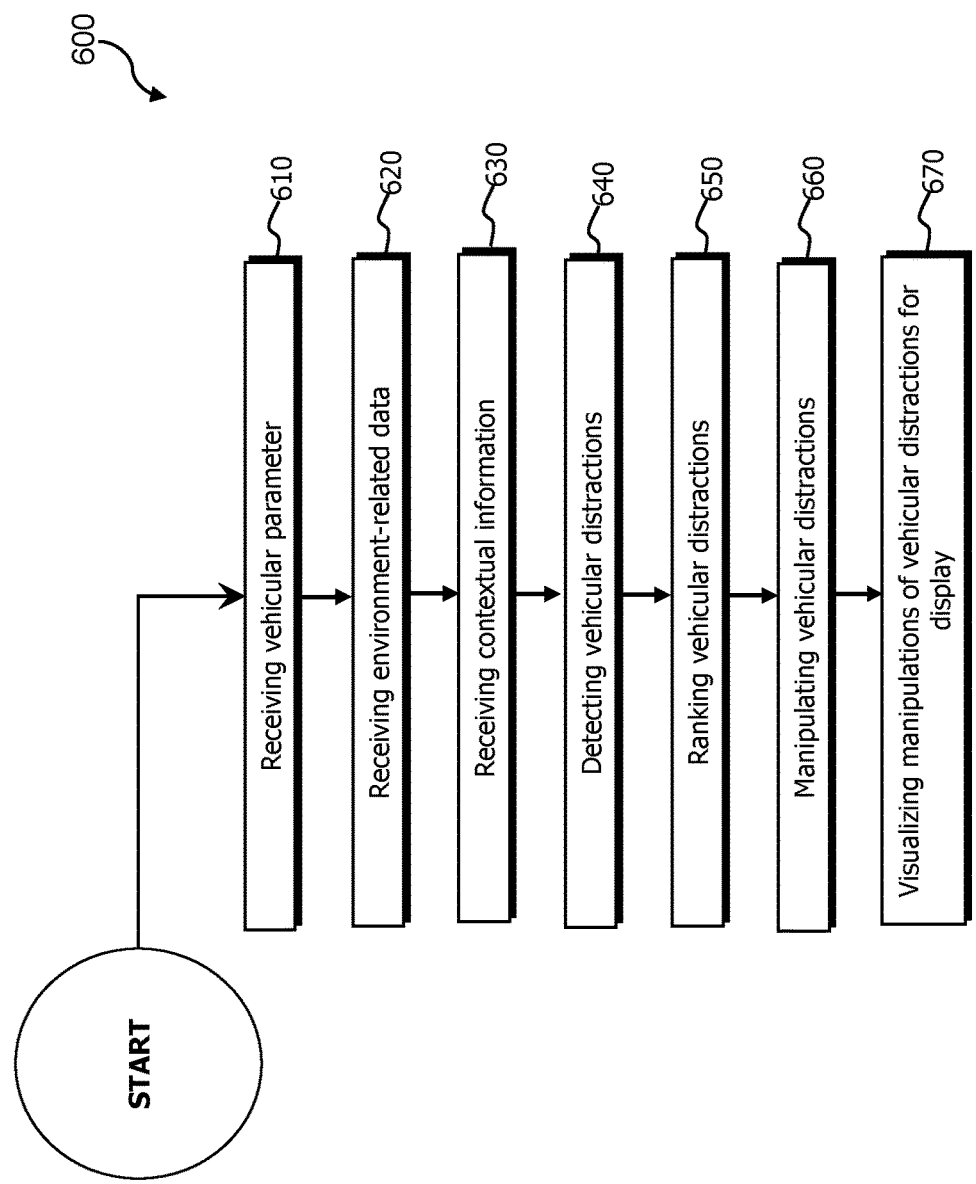
FIG. 6 illustrates an exemplary flowchart depicting a method for manipulating vehicular displays, according to an exemplary embodiment.

With the foregoing overview of the example architecture, it may be helpful now to consider a high-level discussion of an example process. FIG. 6 depicts a flowchart illustrating a computer-implemented process 600 for manipulating vehicular displays, consistent with an illustrative embodiment. Process 600 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process.

At step 610 of process 600, sensor data module 310 receives the vehicular parameters. In some embodiments, the vehicular parameters are derived from sensor data collected by sensor data module 310, in which sensor data module 310 may comprises one or more of cameras, microphones, position sensors, gyroscopes, accelerometers, pressure sensors, cameras, microphones, temperature sensors, biological-based sensors (e.g., heartrate, biometric signals, etc.), a bar code scanner, an RFID scanner, an infrared camera, a forward-looking infrared (FLIR) camera for heat detection, a time-of-flight camera for measuring distance, a LaDAR sensor, a LiDAR sensor, a temperature sensor, a humidity sensor, a motion sensor, internet-of-things ("IoT") sensors, or any other applicable type of sensors known to those of ordinary skill in the art. Vehicular parameters derived from collected sensor data may include one or more of internal/external temperatures, air quality, trip duration, route traffic, road conditions, neighborhood propensity, vehicle suspension, tire pressure, and any other applicable ascertainable vehicle parameter associated with the internal/external environment known to those of ordinary skill in the art.

At step 620 of process 600, server 210 and/or vehicle parameters module 220 receives environment-related data associated with the vehicle. In some embodiments, server 210 and/or vehicle parameters module 220 may be communicatively coupled to computer vision systems, monitoring systems, CCTV systems, satellite systems, weather systems, traffic data systems, and any other applicable external environment data-based system known to those of ordinary skill in the art. It should be noted that one of the purposes of collecting environment-related data is to allow mapping of the external environment associated with the vehicle in order for distraction identification to occur. Simultaneously, the user profile associated with user 270 is being analyzed and any other applicable user-related data is being ascertained for the purpose of subsequently identifying distractions in light of the acquired contextual information.

At step 630 of process 600, context module 330 ascertains contextual information associated with user 270 and/or the vehicle. It should be noted that one of the purposes of ascertaining contextual information is to guide identification of distractions with respect to user 270 and/or the vehicle. For example, the driving experience of user 270 ascertained from the user profile may provide context as to what is considered a distraction in accordance with the operation and/or occupancy of the vehicle. In some embodiments, contextual information may be filtered based on the mode that the vehicle is in (i.e., autonomous or manual mode). Furthermore, analysis of the contextual information is important for the purpose of not only identifying and ranking distractions, but also manipulating the distractions for subsequent visualization to user 270 on the applicable vehicular display mechanism(s).

At step 640 of process 600, distraction detection module 340 performs detection of vehicular distractions. Distraction detection module 340 not only actively detects visible and audible distractions along one or more routes the applicable vehicle is traversing, but also communicated with machine learning module 360 to predict potential distractions that user 270 may come across along the one or more routes based on factors including but not limited to contextual information, a threshold proximity to the vehicle, vehicle location, user profile, previous interactions, complexity of the distraction, whether the vehicle is in manual or automated mode, and the like. Distraction detection module 340 utilizes natural language processing ("NLP")/linguistics processing, image/media recognition, object recognition, segmenting, convoluted neural networks, predictive analytics, behavioral classification techniques, and the like in order to detect internal/external distractions.

At step 650 of process 600, distraction ranking module 350 performs ranking of the detected vehicular distractions. The ranking of distractions along with the distraction threshold may be established by distraction ranking module 350 based on one or more of user profile, vehicle parameters, location of the applicable vehicle, contextual information, focus score (e.g., level of attentiveness of user 270), and the like. In some embodiments, distraction ranking module 350 establishes a distraction threshold which is assigned to identified distractions, in which the distraction threshold may be correlated to a level of visibility of the distraction for user 270 through the applicable vehicular display. The level of visibility may be adjusted based upon one or more of the detect mode of the vehicle, contextual information, and the like.

At step 660 of process 600, distraction manipulation module 370 manipulates the identified distractions. Manipulations may amplify distractions with captivating graphics (e.g., applied multi-media content, volumetric video, holograms, etc.), modify sound files, remove/conceal/obscure distractions, modify the size or orientation of distractions, change the opacity/visibility of distractions, visualize supporting text (e.g., upcoming turn, wrong direction, traffic ahead, etc.), and any other applicable vehicular multi-media presentation known to those of ordinary skill in the art. In some embodiments, once distractions are identified and ranked, distraction manipulation module 370 may provide visual (e.g., video, text, etc.) and/or audio supplemental information relating to the roadside activities for presentation within the vehicle. Distraction manipulation module 370 further manages which distractions are depicted, obscured, and/or concealed from outside of the vehicle based on one or more of user preferences, contextual information, and/or outputs the machine learning models operated by machine learning module 360.

At step 670 of process 600, visualization module 380 visualizes manipulations of vehicular distractions on the applicable vehicular display. It should be noted that the visualization module 380 is configured to utilize a generative adversarial network (GAN) to render visualizations and other applicable multi-media content to the applicable vehicular displays. In some embodiments, the scheduling of rendering of manipulations is subject to one or more of the priority assigned to the applicable distraction, contextual information, and/or the mode that the vehicle is in. Manipulations visualized on the GAN-enabled display may configured to receive user inputs such as, but not limited to virtual keyboard entries, user gestures (e.g., swipes, waves, eye-based movements, etc.), linguistic input-based gestures (i.e., voice commands), and the like, in which the user inputs may modify the manipulations in real-time as they are presented to user 270; however, this feature may be subject to whether the vehicle is in autonomous mode as to not impact manual operation of the vehicle.

Based on the foregoing, a method, system, and computer program product have been disclosed. However, numerous modifications and substitutions can be made without deviating from the scope of the present invention. Therefore, the present invention has been disclosed by way of example and not limitation.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-payment devices or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g. light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter payment device or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that, although specific embodiments have been described herein for purposes of illustration, various modifications may be made without departing from the spirit and scope of the embodiments. In particular, transfer learning operations may be carried out by different computing platforms or across multiple devices. Furthermore, the data storage and/or corpus may be localized, remote, or spread across multiple systems. Accordingly, the scope of protection of the embodiments is limited only by the following claims and their equivalent.

What is claimed is:

1. A computer-implemented method for manipulating vehicular displays, the method comprising:
   receiving, by a computing device, a plurality of parameters associated with a vehicle;
   analyzing, by the computing device, an environment associated with the vehicle based on the parameters;
   detecting, by the computing device, at least one distraction within the environment based on the analysis; and
   manipulating, by the computing device, the at least one distraction based on a plurality of contextual information of at least one occupant associated with the vehicle;
   wherein manipulating comprises adjusting a level of visibility of the at least one distraction based on the plurality of contextual information.

2. The computer-implemented method of claim 1, wherein detecting the at least one distraction comprises ranking the at least one distraction based on the plurality of contextual information.

3. The computer-implemented method of claim 2, wherein manipulating the at least one distraction comprises:
incrementally increasing, by the computing device, the level of visibility of the at least one distraction to the at least one occupant based on the ranking.

4. The computer-implemented method of claim 1, wherein manipulating the at least one distraction comprises:
utilizing, by the computing device, a generative adversarial network (GAN) to generate a visualization modifying or removing the at least one distraction based on the plurality of contextual information.

5. The computer-implemented method of claim 1, wherein the plurality of parameters comprises one or more of vehicle information, road conditions, weather conditions, social media information, crowdsourcing information, and driving skills associated with the at least one occupant.

6. The computer-implemented method of claim 1, wherein manipulating the at least one distraction comprises:
classifying, by the computing device, the at least one distraction and modifying an audio file associated with the at least one distraction based on an analysis of the plurality of contextual information.

7. The computer-implemented method of claim 3, wherein detecting the at least one distraction comprises:
assigning, by the computing device, a threshold to the level of visibility based on the plurality of parameters;
wherein the level of visibility increases for the at least one distraction based upon the threshold being exceeded.

8. A computer program product for manipulating vehicular displays, the computer program product comprising or more computer readable storage media and program instructions collectively stored on the one or more computer readable storage media, the stored program instructions comprising:
program instructions to receive a stream of media data associated with a virtual environment;
program instructions to analyze a plurality of sensor data associated with a user of the virtual environment;
program instructions to detect one or more obstacles associated with the virtual environment; and
program instructions to optimize the stream of media data, program instructions to optimize further comprising manipulation of the one or more obstacles based on the analysis of the plurality of sensor data;
program instructions to receive a plurality of parameters associated with a vehicle;
program instructions to analyze an environment associated with the vehicle based on the parameters;
program instructions to detect at least one distraction within the environment based on the analysis; and
program instructions to manipulate the at least one distraction based on a plurality of contextual information of at least one occupant associated with the vehicle;
wherein program instructions to manipulate comprise program instructions to adjust a level of visibility of the at least one distraction based on the plurality of contextual information.

9. The computer program product of claim 8, wherein program instructions to detect the at least one distraction comprise:
program instructions to rank the at least one distraction based on the plurality of contextual information.

10. The computer program product of claim 9, wherein program instructions to manipulate the at least one distraction comprise:
program instructions to incrementally increase the level of visibility of the at least one distraction to the at least one occupant based on the ranking.

11. The computer program product of claim 8, wherein program instructions to manipulate the at least one distraction comprise:
program instructions to utilize a generative adversarial network (GAN) to generate a visualization modifying or removing the at least one distraction based on the plurality of contextual information.

12. The computer program product of claim 9, wherein the plurality of parameters comprises one or more of vehicle information, road conditions, weather conditions, social media information, crowdsourcing information, and driving skills associated with the at least one occupant.

13. The computer program product of claim 9, wherein program instructions to manipulate the at least one distraction comprise:
program instructions to classify the at least one distraction and modifying an audio file associated with the at least one distraction based on an analysis of the plurality of contextual information.

14. The computer program product of claim 10, wherein program instructions to detect the at least one distraction comprise:
program instructions to assign a threshold to the level of visibility based on the plurality of parameters;
wherein the level of visibility increases for the at least one distraction based upon the threshold being exceeded.

15. A computer system for manipulating vehicular displays, the computer system comprising:
one or more processors;
one or more computer-readable memories;
program instructions stored on at least one of the one or more computer-readable memories for execution by at least one of the one or more processors, the program instructions comprising:
program instructions to receive a stream of media data associated with a virtual environment;
program instructions to analyze a plurality of sensor data associated with a user of the virtual environment;
program instructions to detect one or more obstacles associated with the virtual environment; and
program instructions to optimize the stream of media data, program instructions to optimize further comprising program instructions to manipulate the one or more obstacles based on the analysis of the plurality of sensor data;
wherein program instructions to manipulate comprise program instructions to adjust a level of visibility of the one or more obstacles.

16. The computer system of claim 15, wherein program instructions to detect the at least one distraction comprise:
program instruction to rank the at least one distraction based on the plurality of contextual information.

17. The computer system of claim 16, wherein program instructions to manipulate the at least one distraction comprise:
program instructions to incrementally increase the level of visibility of the at least one distraction to the at least one occupant based on the ranking.

18. The computer system of claim 15, wherein program instructions to manipulate the at least one distraction comprise:
program instructions to utilize a generative adversarial network (GAN) to generate a visualization modifying or removing the at least one distraction based on the plurality of contextual information.

19. The computer system of claim 15, wherein program instructions to manipulate the at least one distraction comprise:
program instructions to classify the at least one distraction and modifying an audio file associated with the at least one distraction based on an analysis of the plurality of contextual information.

20. The computer system of claim 17, wherein program instructions to detect the at least one distraction comprise:
program instructions to assign a threshold to the level of visibility based on the plurality of parameters;
wherein the level of visibility increases for the at least one distraction based upon the threshold being exceeded.

* * * * *